United States Patent [19]
Carpenter

[11] 3,743,942
[45] July 3, 1973

[54] COMPRESSIVE SCANNING RECEIVER

[75] Inventor: Ralph A. Carpenter, Temple Hills, Md.

[73] Assignee: The United States of America as represented by the Secretary of the Navy, Washington, D.C.

[22] Filed: June 16, 1972

[21] Appl. No.: 263,486

[52] U.S. Cl............... 325/337, 324/77 CS, 325/363
[51] Int. Cl. ............................................. H04b 1/36
[58] Field of Search............ 325/332, 333, 335–337, 325/311, 435, 484, 487, 67, 363; 324/77 B, 77 C, 77 CS

[56] References Cited
UNITED STATES PATENTS
2,973,478 2/1961 Hurvitz................................ 325/336
2,499,995 3/1950 Heller.............................. 224/77 CS

*Primary Examiner*—Robert L. Griffin
*Assistant Examiner*—Marc E. Bookbinder
*Attorney*—R. S. Sciascia, Arthur L. Branning et al.

[57] ABSTRACT

A frequency-scanning intercept receiver which compresses any given received (target) signal so that it looks like a spike at a single frequency instead of the usual sin X/X curve, the novel components comprising a frequency discriminator providing an error voltage, $E_e$, proportional to the difference between the i.f. frequency of the receiver and the instantaneous frequency of the mixer output and a differential amplifier which adds the error voltage and a voltage, $E_f$, proportional to the instantaneous frequency of the frequency-scanning oscillator to give a frequency-compensated output voltage, $E_c$, which is proportional to the frequency of the target signal and is used as a horizontal sweep voltage for the visual display means of the receiver.

3 Claims, 4 Drawing Figures

COMPRESSIVE SCANNING RECEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to spectrum compression and especially to the compression of the frequency spectrum of a received signal of an intercept receiver into a single line.

Receiver intercept systems are presently employed in electronic warfare. These systems scan through a frequency band to intercept whatever signals are being transmitted in that band. Some systems use a scanning superheterodyne receiver which, in passing a continuous wave signal, produces a frequency - modulated pulse in the intermediate-frequency amplifier. If the scanning rate is significantly high, the sidebands which are generated reduce the peak signal-to-noise ratio and disperse the displayed signal over a frequency band, the envelope of the spectrum of the dispersed signal having a hill-like appearance. This rather broad characteristic limits the ability of the operator to determine the exact frequency of the received signal. Frequency resolution is also limited.

An object of the present invention is to compress the frequency spectrum of a signal received by a scanning intercept receiver so that the received signal is substantially a single line with respect to frequency.

Another object is to provide a new intercept receiver system having a high probability of intercept when scanning in frequency and greatly improved frequency resolution and accuracy with essentially no loss in sensitivity at high scanning rates.

Other objects, advantages and novel features of the invention will become apparent from the following detailed description of the invention when considered in conjunction with the accompanying drawings wherein:

DETAILED DESCRIPTION OF THE INVENTION

Figure 1:
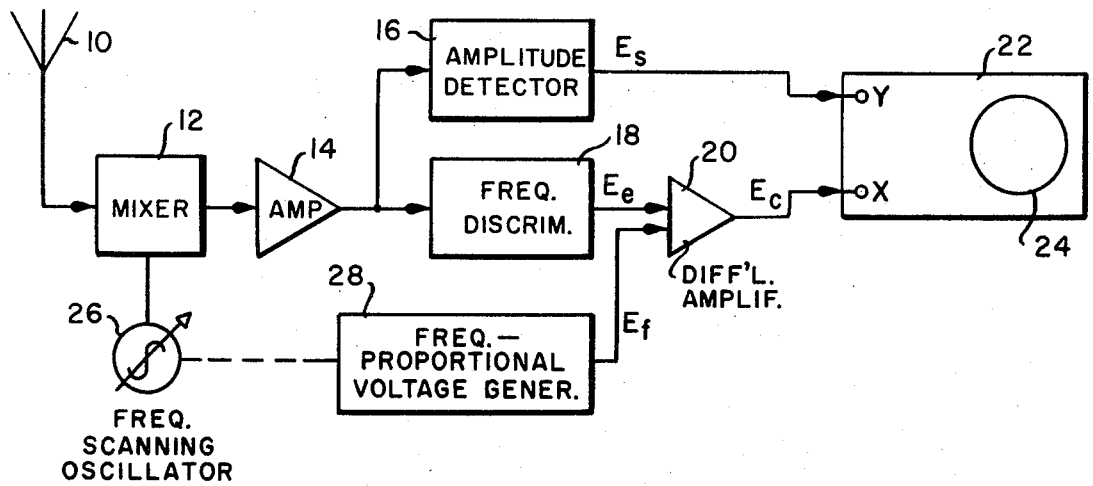
FIG. 1 is a schematic illustration in block form of an embodiment of the invention.

One type of intercept receiver is shown in FIG. 1. Signals are received by an antenna 10 and fed to a mixer 12 where they are combined with a periodic signal from the frequency-scanning oscillator 26 which sweeps through a frequency band at a predetermined scanning rate. The output of the mixer 12, if a signal is received by the antenna 10 is a signal at the intermediate frequency (i.f.) of the receiver which, when passed through the bandwidth of the amplifier 14 results in a signal spread over the bandwidth of the amplifier 14. The amplifier output is fed to an amplitude detector 16 which provides an output signal, $E_s$, to the vertical input of a display device, such as the cathode ray tube 22.

Figure 2:
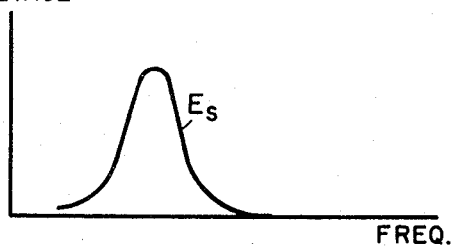
FIG. 2 is the characteristic curve (amplitude vs. frequency) of a received signal after amplitude detection in a conventional intercept receiver.
Figure 3:
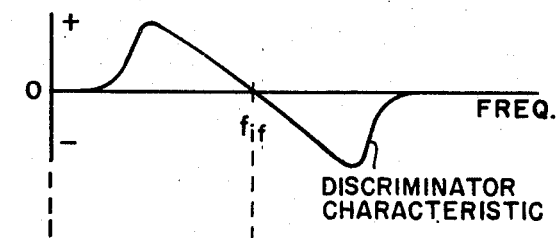
FIG. 3 is the way the signal shown in FIG. 2 looks after processing in accordance with the invention.
Figure 3:
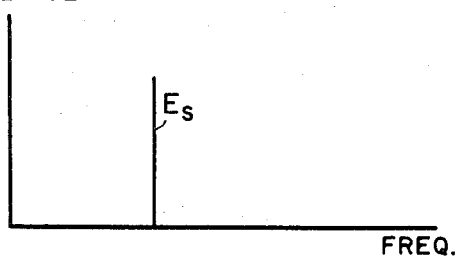

In the ordinary intercept receiver the horizontal-sweep drive signal for the CRT 22 is a voltage, $E_f$, which is proportional to the frequency of the scanning oscillator 26 and the signal, $E_s$, from the scanning oscillator which appears on the screen 24 of the CRT is a hill-like curve as shown in FIG. 2. The voltage proportional to the frequency of the oscillator is provided by the frequency-proportional-signal generator 28, which may for example be a motor driven potentiometer. The invention, however, contemplates the use of a circuit such as the frequency discriminator 18 for providing an error signal, $E_e$, which is proportional to the difference between the fixed intermediate frequency, $f_{if}$, and the instantaneous frequency of the output from the mixer (which occurs when a signal is received by the antenna and is scanned). The output of the mixer is proportional to the frequency of the received signal. The signals, $E_e$ and $E_f$, are combined algebraically, in a differential amplifier, for example, the resulting signal, $E_c$, being a compensated signal which is proportional to the exact frequency of the received signal. When this is applied to the horizontal sweep circuit of the CRT 22 as a driving signal, the received signal is displayed as a single line, or spike (as shown in FIG. 3) at a discrete frequency, which is its carrier frequency.

Figure 4:
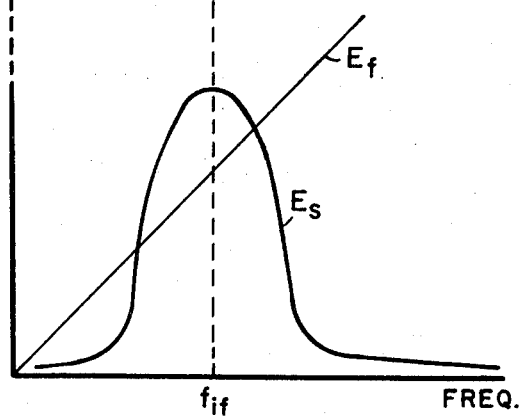
FIG. 4 is a group of curves showing the characteristic of the discriminator and the outputs, $E_s$ and $E_f$.

The characteristic curves and voltages involved in the operation of this invention are shown in FIG. 4. The signal from the amplifier 14, in passing through the discriminator 18 provides an output signal which decreases in amplitude at a rate which compensates for the increase in amplitude of $E_f$, the signal which is proportional to the frequency of the scanning oscillator 26. The discriminator is set to provide zero output at the intermediate center frequency, $f_{if}$ (see FIG. 4) of the mixer; for effective operation, the linear portion of its operating range should extend well beyond the one-half power points of the $E_s$ curve, preferably to the one-tenth power points.

The invention provides a high probability of intercepting and measuring the centroid of the frequency spectrum of a signal having an extremely short time duration. Also, multiple signals within the passband of the receiver, not coincident in time, can be resolved to a small fraction of the bandwidth.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a frequency scanning intercept receiver having at least antenna means, mixing means, frequency-scanning oscillator means connected to said mixing means, amplifying and amplitude-detecting means connected to receive the mixed signal and provide an output signal, $E_s$, visual display means to the vertical input terminals of which $E_s$ is connected, and means coupled to said scanning oscillator for generating an output signal, $E_f$, proportional to the instantaneous frequency of the oscillator;

means, receiving part of the amplified output signal of said mixer, for generating an error signal, $E_e$, proportional to the difference between the i.f. center frequency, $f_{if}$, of the intercept receiver and the instantaneous frequency of the mixer output; and means, receiving as inputs said signals $E_e$ and $E_f$, for combining its input signals and producing an output signal, $E_c$, proportional to the exact frequency of the signal received by the intercept receiver, said signal, $E_c$, being connected to said visual display device for use as a sweep signal therein.

2. An intercept receiver as in claim 1, wherein said means for generating said error signal comprises a frequency discriminator.

3. An intercept receiver as in claim 1, wherein said means for producing said compensated signal, $E_c$, comprises a differential amplifier.

* * * * *